(12) United States Patent
Morikawa

(10) Patent No.: US 11,777,627 B2
(45) Date of Patent: Oct. 3, 2023

(54) SERIAL COMMUNICATION APPARATUS AND SERIAL COMMUNICATION METHOD THAT ARE CAPABLE OF EFFICIENTLY ELIMINATING A TIMING LAG BETWEEN SERIAL, DATA TRANSFERRED VIA A PLURALITY OF ROUTES IN SERIAL COMMUNICATION

(71) Applicant: CANON KABUSHIKI KAISHA, Tokyo (JP)

(72) Inventor: Daisuke Morikawa, Hyogo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/730,439

(22) Filed: Apr. 27, 2022

(65) Prior Publication Data
US 2022/0385388 A1   Dec. 1, 2022

(30) Foreign Application Priority Data
May 27, 2021 (JP) .................................. 2021-089306

(51) Int. Cl.
*H04J 3/24* (2006.01)
*H04J 3/06* (2006.01)
*H04L 69/22* (2022.01)

(52) U.S. Cl.
CPC ............ *H04J 3/0658* (2013.01); *H04L 69/22* (2013.01)

(58) Field of Classification Search
CPC ........ H04J 3/0658; H04L 69/22; H04L 25/14; H04L 2012/5652; H04L 29/0653; H04L 47/10; H04L 29/06; G06F 13/4226; G06F 13/4295; Y02D 10/00; H04Q 11/0478
See application file for complete search history.

(56) References Cited

U.S. PATENT DOCUMENTS

| | | | |
|---|---|---|---|
| 10,129,371 B2 | 11/2018 | Natsukawa | |
| 2012/0120289 A1* | 5/2012 | Sugioka | G06T 1/0007 348/294 |
| 2015/0180782 A1* | 6/2015 | Rimmer | H04L 49/112 370/235 |

(Continued)

FOREIGN PATENT DOCUMENTS

JP    6531513 B2    6/2019

*Primary Examiner* — Phuongchau Ba Nguyen
(74) *Attorney, Agent, or Firm* — ROSSI, KIMMS & MCDOWELL LLP

(57) ABSTRACT

A serial communication apparatus capable of efficiently eliminating a timing lag between serial data transferred via a plurality of routes in serial communication is provided. The serial communication apparatus transfers serial data transmitted from a transmitting side communication unit disposed on a transmitting side to a receiving side communication unit disposed on a receiving side via a plurality of lanes. The transmitting side communication unit comprises a packet transmitting unit configured to divide transmission data into equal parts according to the number of the lanes, distribute the divided transmission data to each lane as a data main body, and add header information indicating the type of the transmission data to the divided transmission data distributed to each lane. The receiving side communication unit comprises a received packet skew adjusting unit configured to adjust skew of data received in each lane.

9 Claims, 12 Drawing Sheets

(56) References Cited

U.S. PATENT DOCUMENTS

| | | | | |
|---|---|---|---|---|
| 2015/0312476 A1* | 10/2015 | Wakabayashi | ........... | H04N 1/41 |
| | | | | 348/231.99 |
| 2019/0075191 A1* | 3/2019 | Kunii | ...................... | H04J 3/047 |
| 2021/0360151 A1* | 11/2021 | Mizuno | ................ | H04N 23/555 |

* cited by examiner

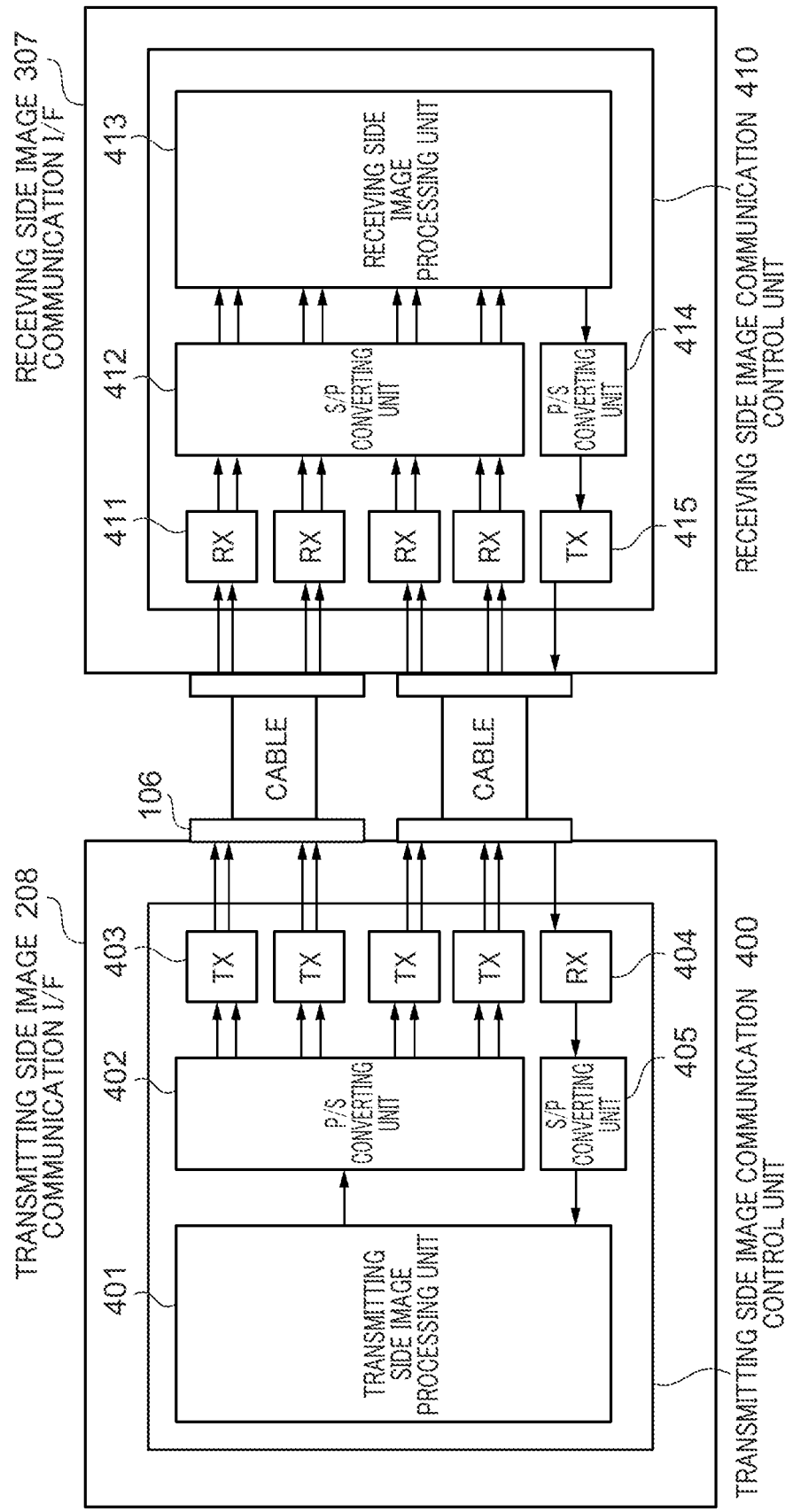

FIG. 6A

N cycle

| Lane0 | header | data0 | data1 | ... | dataN-1 |
|---|---|---|---|---|---|
| Lane1 | header | dataN | dataN+1 | ... | data2N-1 |
| Lane2 | header | data2N | data2N+1 | ... | data3N-1 |
| Lane3 | header | data3N | data3N+1 | ... | data4N-1 |
| Lane4 | header | data4N | data4N+1 | ... | data5N-1 |
| Lane5 | header | data5N | data5N+1 | ... | data6N-1 |
| Lane6 | header | data6N | data6N+1 | ... | data7N-1 |
| Lane7 | header | data7N | data7N+1 | ... | data8N-1 |

FIG. 6B

M cycle

| Lane0 | header | data0 | data1 | ... | dataM-1 |
|---|---|---|---|---|---|
| Lane1 | header | dataM | dataM+1 | ... | data2M-1 |
| Lane2 | header | data2M | data2M+1 | ... | data3M-1 |
| Lane3 | header | data3M | data3M+1 | ... | data4M-1 |
| Lane4 | header | data4M | data4M+1 | ... | data5M-1 |
| Lane5 | header | data5M | data5M+1 | ... | padding |

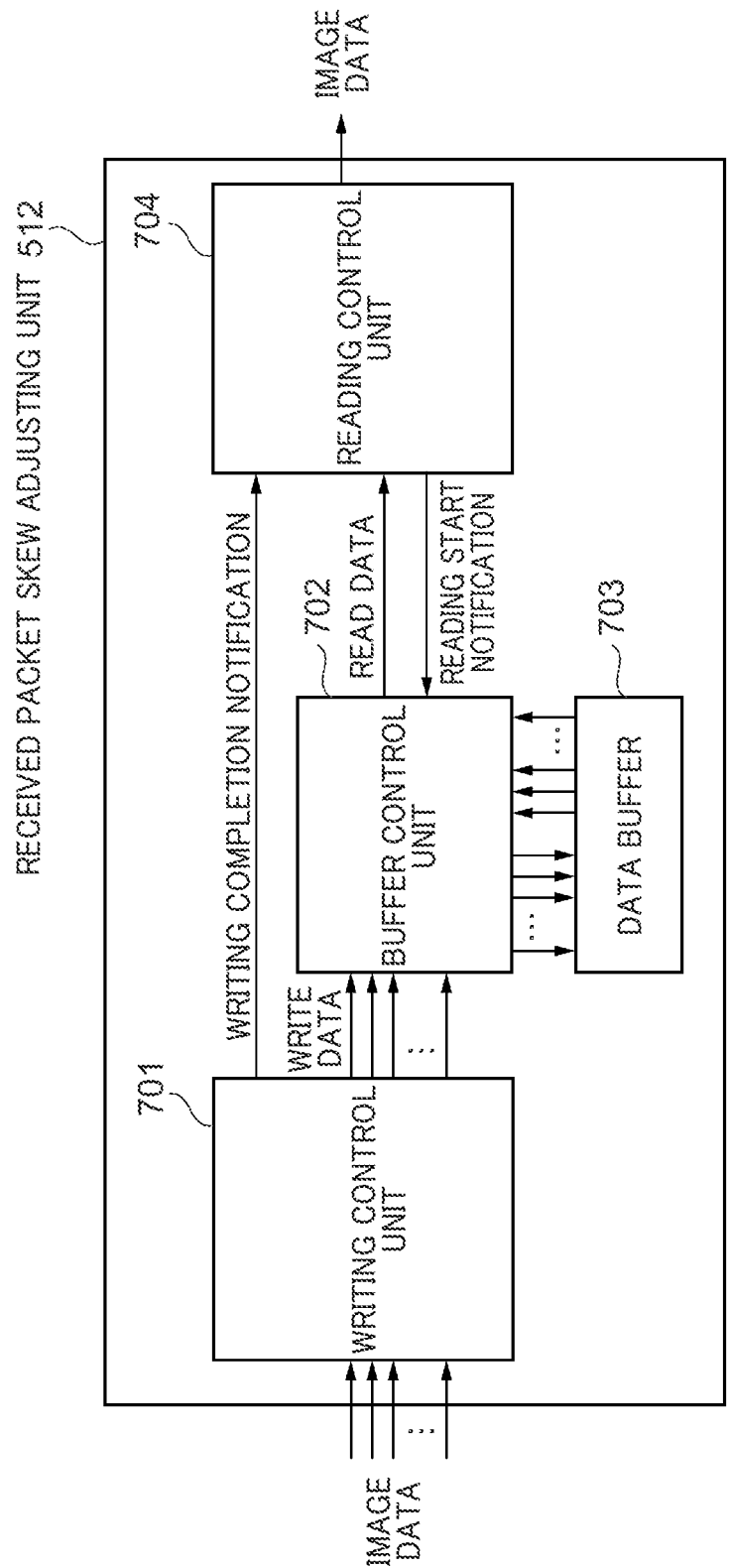

SERIAL COMMUNICATION APPARATUS AND SERIAL COMMUNICATION METHOD THAT ARE CAPABLE OF EFFICIENTLY ELIMINATING A TIMING LAG BETWEEN SERIAL, DATA TRANSFERRED VIA A PLURALITY OF ROUTES IN SERIAL COMMUNICATION

BACKGROUND OF THE INVENTION

Field of the Invention

The present invention relates to a serial communication apparatus and a serial communication method that are capable of efficiently eliminating a timing lag between serial data transferred via a plurality of routes in serial communication.

Description of the Related Art

In the field of production printing, a printing system that performs printing control from a printing control apparatus having a high-performance RIP (raster image processor) processing unit with respect to an image forming apparatus such as a printer or a multifunction peripheral (MFP) is used.

With the recent increase in image quality and productivity of the printing system, high-speed transmission and reception of image data from the printing control apparatus disposed on a transmitting side to the image forming apparatus disposed on a receiving side (hereinafter, also simply referred to as "high-speed transfer of image data") is requested. In order to deal with such a request, in the printing system, as a method of transferring the image data, a serial communication method that serializes the image data by a parallel/serial conversion (hereinafter, simply referred to as "a P/S conversion") and transfers the image data serialized at high speed is adopted.

Specifically, a printing system, which adopts the serial communication method described above, divides a large amount of image data into a plurality of routes (that is, lanes), performs the P/S conversion with respect to the divided image data in parallel simultaneously, and transfers it as serial data via the plurality of routes. In this case, although the serial data of the plurality of routes is transferred (transmitted) in parallel, since there is a timing lag between the serial data transferred via each route due to data transfer delay for each route, etc., it is necessary to synchronize the serial data of the plurality of routes.

In serial communication, for example, as a technique for synchronizing serial data transferred in parallel via a plurality of routes, a technique disclosed in Japanese Patent No. 6531513 has been proposed. In the technique disclosed in Japanese Patent No. 6531513, in a serial communication apparatus, a transmission processing circuit generates a protocol in which a plurality of pieces of valid data are added between a data transmission start frame and a data transmission completion frame for each channel (lane). In addition, a reception processing circuit detects the data transmission start frame of each channel, stores the valid data in a reception buffer circuit provided for each channel, detects a boundary between the valid data and the data transmission completion frame, and extracts the valid data from the reception buffer circuit. As described above, in the technique disclosed in Japanese Patent No. 6531513, as the protocol, by adding the data transmission start frame and the data transmission completion frame with respect to the valid data, the serial data transferred in parallel via the plurality of routes is synchronized.

However, in the technique disclosed in Japanese Patent No. 6531513, as the protocol, since the data transmission start frame and the data transmission completion frame are added with respect to the valid data, a problem that an effective transfer efficiency of data is reduced occurs. In addition, in the reception processing circuit of the technique disclosed in Japanese Patent No. 6531513, it is necessary to perform complicated control that detects the data transmission start frame of each channel, stores the valid data in the reception buffer circuit provided for each channel, and performs data transfer from the reception buffer circuit to the outside after a skew removing processing. Since the reception processing circuit of the technique disclosed in Japanese Patent No. 6531513 performs this complicated control, there is also a problem that the circuit scale of the reception processing circuit is increased.

SUMMARY OF THE INVENTION

The present invention provides a serial communication apparatus and a serial communication method that are capable of efficiently eliminating a timing lag between serial data transferred via a plurality of routes in serial communication.

Accordingly, the present invention provides a serial communication apparatus that transfers serial data transmitted from a transmitting side communication unit disposed on a transmitting side to a receiving side communication unit disposed on a receiving side via a plurality of lanes, wherein the transmitting side communication unit comprises a packet transmitting unit configured to divide transmission data into equal parts according to the number of the lanes, distribute the divided transmission data to each lane as a data main body, and add header information indicating the type of the transmission data to the divided transmission data distributed to each lane, wherein the receiving side communication unit comprises a received packet skew adjusting unit configured to adjust skew of data received in each lane, and wherein the received packet skew adjusting unit detects the header information of the data received in each lane, writes the data main body of the received data to a data buffer at a detection timing, and starts data transfer from the data buffer to the outside at a timing when a writing access of the data main body of a predetermined number of cycles is completed in each lane.

According to the present invention, it is possible to efficiently eliminate the timing lag between the serial data transferred via the plurality of routes in the serial communication.

Further features of the present invention will become apparent from the following description of exemplary embodiments with reference to the attached drawings.

BRIEF DESCRIPTION OF THE DRAWINGS

FIG. 4 is a block diagram that shows a configuration example of a serial communication apparatus that is configured by a transmitting side image communication I/F of the printing control apparatus in the printing system according to the first embodiment and a receiving side image communication I/F of the image forming apparatus in the printing system according to the first embodiment (a serial communication apparatus according to the first embodiment).

FIGS. 6A and 6B are conceptual diagrams that show packet configurations of data transferred by the serial communication apparatus according to the first embodiment, FIG. 6A is the conceptual diagram that shows the packet configuration of data divided into eight lanes, and FIG. 6B is the conceptual diagram that shows the packet configuration of data divided into six lanes.

FIG. 7 is a block diagram that shows a configuration example of a received packet skew adjusting unit in the receiving side image processing unit of the serial communication apparatus according to the first embodiment.

FIG. 8A is a conceptual diagram for explaining the skew adjusting operation on writing side of the received packet skew adjusting unit of FIG. 7, and FIG. 8B is a conceptual diagram for explaining the skew adjusting operation on reading side of the received packet skew adjusting unit of FIG. 7.

DESCRIPTION OF THE EMBODIMENTS

The present invention will now be described in detail below with reference to the accompanying drawings showing embodiments thereof.

Hereinafter, each embodiment of the present invention will be described in detail with reference to the drawings. However, the configurations described in the following embodiments are merely examples, and the scope of the present invention is not limited by the configurations described in the respective embodiments.

Figure 1:
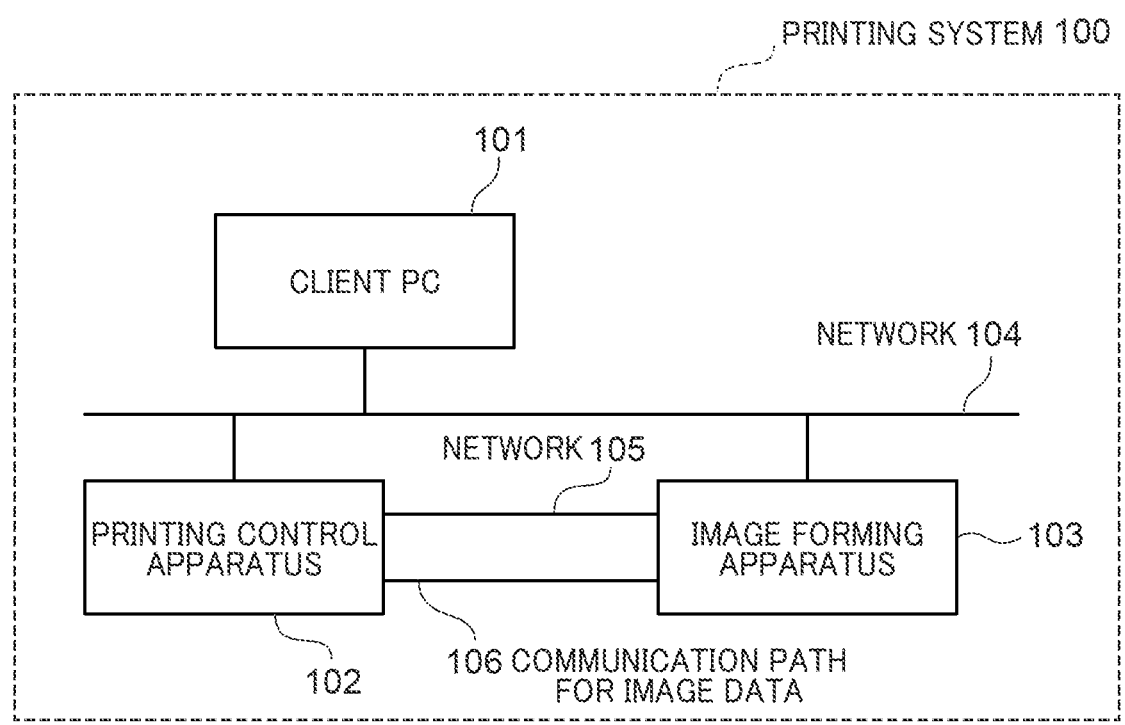
FIG. 1 is a block diagram that shows an overall configuration example of a printing system according to a first embodiment of the present invention.

At first, a first embodiment of the present invention will be described with reference to the drawings. FIG. 1 is a block diagram that shows an overall configuration example of a printing system according to the first embodiment of the present invention.

As shown in FIG. 1, a printing system 100 according to the first embodiment includes a client PC (personal computer) 101, a printing control apparatus 102, and an image forming apparatus 103. The client PC 101, the printing control apparatus 102, and the image forming apparatus 103 are connected via a network 104. Further, the printing control apparatus 102 and the image forming apparatus 103 are connected via a network 105 and a communication path 106 for image data (hereinafter, referred to as "an image data communication path 106").

The client PC 101 transmits printing data used in printing control to the printing control apparatus 102 via the network 104. Moreover, the client PC 101 is not limited to the PC, and may be, for example, an information processing apparatus such as a mobile terminal device.

The printing control apparatus 102 performs a RIP processing with respect to the received printing data to generate raster image data that can be read by the image forming apparatus 103 (hereinafter, simply referred to as "image data"). Further, the printing control apparatus 102 transmits setting information included in the printing data (hereinafter, simply referred to as "printing information") to the image forming apparatus 103 via the network 105. Furthermore, the printing control apparatus 102 transmits the image data generated by the RIP processing to the image forming apparatus 103 via the image data communication path 106.

The image forming apparatus 103 performs printing of the received image data based on the received image data and the received printing information.

Figure 2:
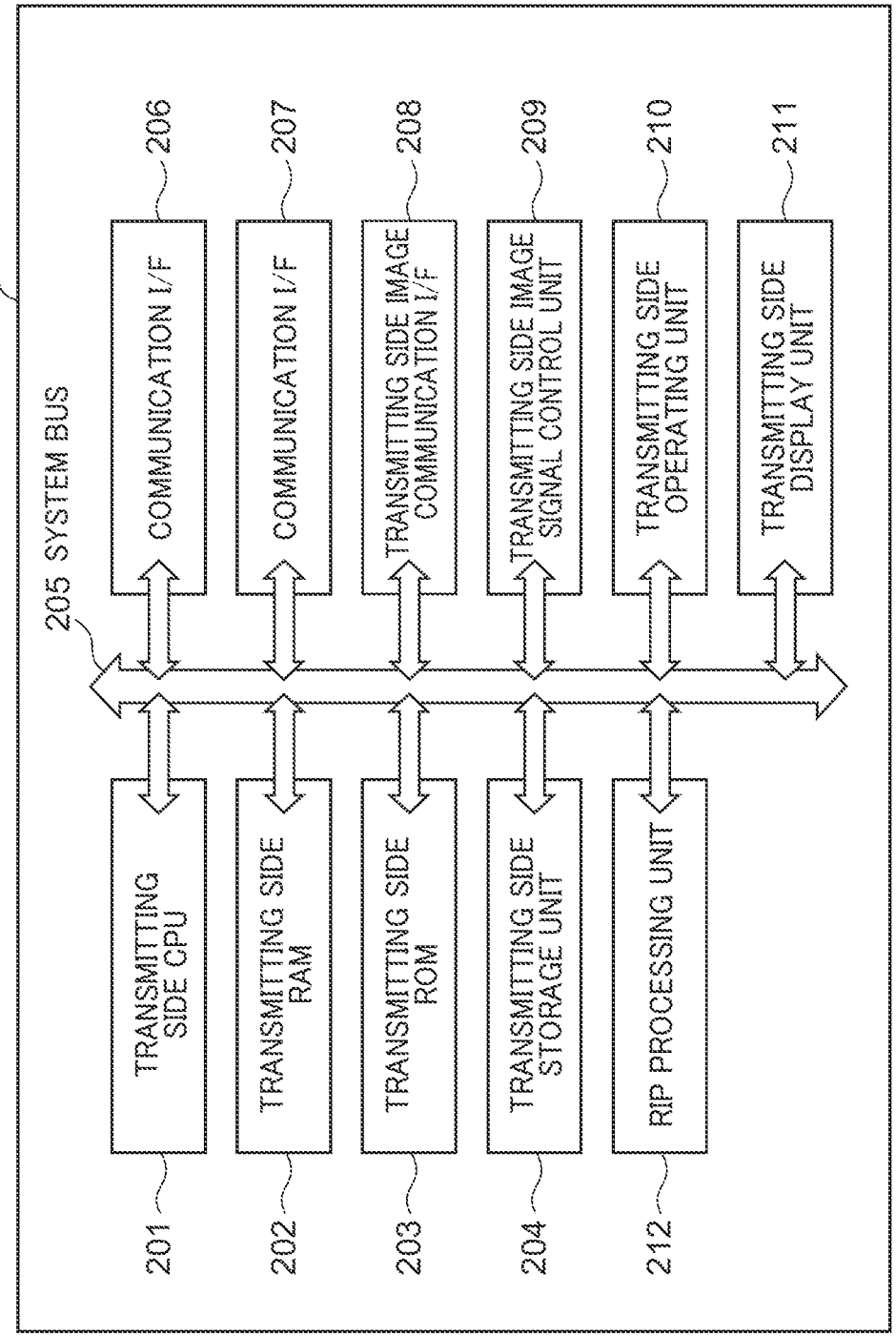
FIG. 2 is a block diagram that shows a configuration example of a printing control apparatus in the printing system according to the first embodiment.

FIG. 2 is a block diagram that shows a configuration example of a printing control apparatus in the printing system according to the first embodiment.

As shown in FIG. 2, the printing control apparatus 102 in the printing system 100 includes a transmitting side CPU (central processing unit) 201, a transmitting side RAM (random access memory) 202, a transmitting side ROM (read only memory) 203, and a transmitting side storage unit 204. In addition, the printing control apparatus 102 includes a communication I/F (interface) 206, a communication I/F 207, a transmitting side image communication I/F 208, a transmitting side image signal control unit 209, a transmitting side operating unit 210, a transmitting side display unit 211, and a RIP processing unit 212. Respective units (respective components) of the printing control apparatus 102 are connected to each other via a system bus 205.

As a transmitting side control means, the transmitting side CPU 201 controls respective units (excluding the transmitting side CPU 201) of the printing control apparatus 102 connected to each other via the system bus 205 based on control programs.

The transmitting side RAM 202 functioning as a working memory temporarily stores processing data and the like when various kinds of control programs are executed.

The transmitting side ROM 203 stores various kinds of control programs for the transmitting side CPU 201 to perform control, various kinds of data, etc. Moreover, various kinds of control programs for the transmitting side CPU 201 to perform control, various kinds of data, etc. may be stored in the transmitting side storage unit 204. The transmitting side storage unit 204 may be configured by, for example, a hard disk drive device (HDD).

The communication I/F 206 is an interface for communicating with the client PC 101 via the network 104. In the printing system 100 according to the first embodiment, the printing control apparatus 102 receives the printing data from the client PC 101 connected to the network 104 via the communication I/F 206. Further, the transmitting side CPU 201 notifies the client PC 101 of various kinds of information regarding the image forming apparatus 103 via the communication I/F 206.

The communication I/F 207 is an interface for communicating with the image forming apparatus 103 via the network 105. In the printing system 100 according to the first embodiment, the transmitting side CPU 201 of the printing control apparatus 102 performs the printing control by transmitting the printing information to the image forming apparatus 103 connected to the network 105 via the communication I/F 207.

The transmitting side image communication I/F 208 is an interface for performing image data communication with the image forming apparatus 103 via the image data communication path 106. In the printing system 100 according to the first embodiment, the transmitting side CPU 201 of the printing control apparatus 102 transmits the image data to the image forming apparatus 103 connected to the image data communication path 106 via the transmitting side image communication I/F 208.

In order for the transmitting side CPU 201 to transmit the image data to the image forming apparatus 103 via the transmitting side image communication I/F 208, the transmitting side image signal control unit 209 performs transmission control of the image data.

The transmitting side operating unit 210 includes a display means and an input means, and is controlled by the transmitting side CPU 201 so that an operator of the printing system 100 can set the printing information in the printing control apparatus 102.

The transmitting side display unit 211 displays a setting screen of the printing information set by the transmitting side operating unit 210, and a printing status.

The RIP processing unit 212 generates the image data by performing the RIP processing with respect to the printing data.

Figure 3:
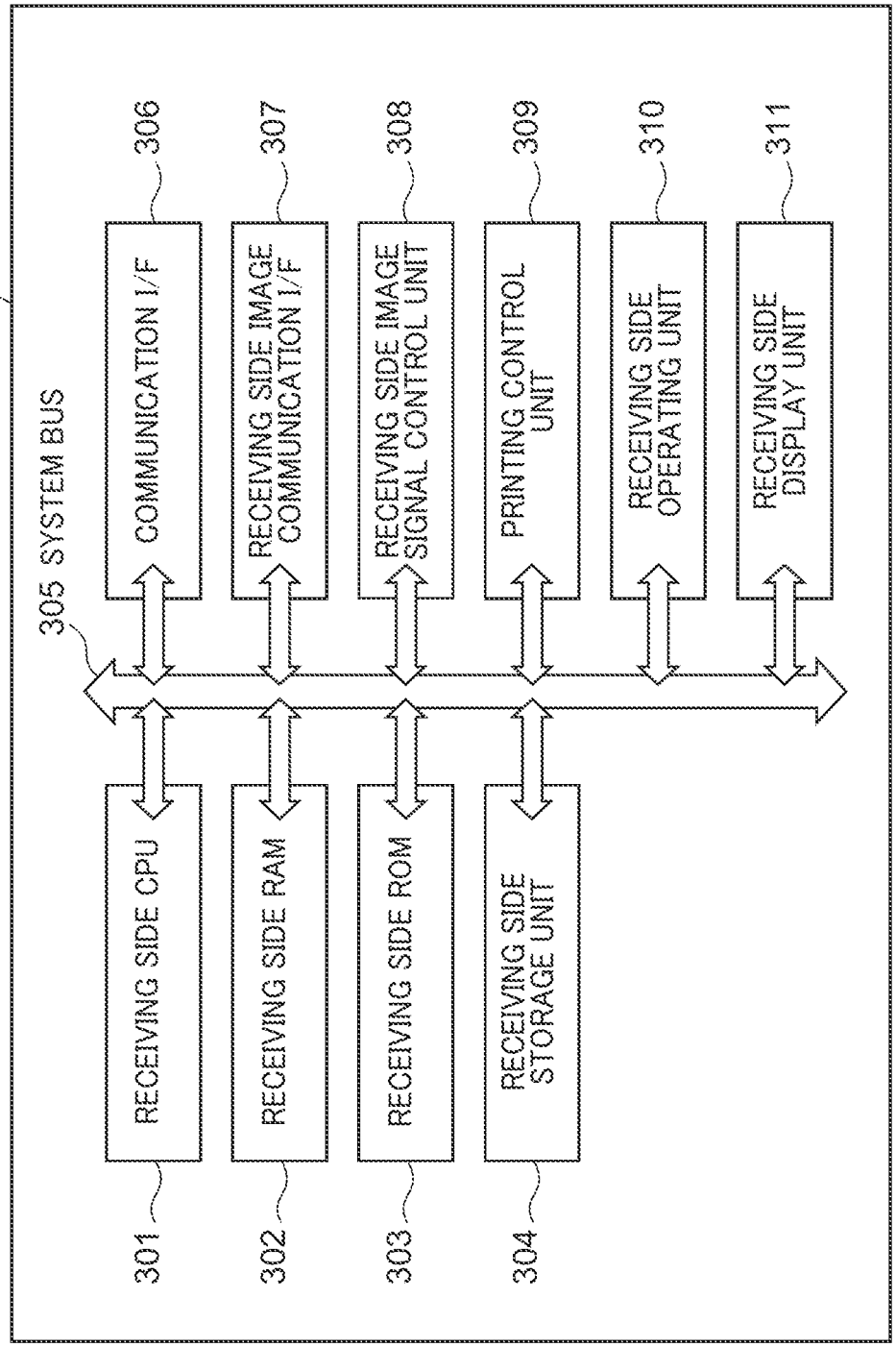
FIG. 3 is a block diagram that shows a configuration example of an image forming apparatus in the printing system according to the first embodiment.

FIG. 3 is a block diagram that shows a configuration example of an image forming apparatus in the printing system according to the first embodiment.

As shown in FIG. 3, the image forming apparatus 103 in the printing system 100 includes a receiving side CPU 301, a receiving side RAM 302, a receiving side ROM 303, a receiving side storage unit 304, and a communication I/F 306. In addition, the image forming apparatus 103 includes a receiving side image communication I/F 307, a receiving side image signal control unit 308, a printing control unit 309, a receiving side operating unit 310, and a receiving side display unit 311. Respective units (respective components) of the image forming apparatus 103 are connected to each other via a system bus 305.

As a receiving side control means, the receiving side CPU 301 controls respective units (excluding the receiving side CPU 301) of the image forming apparatus 103 connected to each other via the system bus 305 based on control programs.

The receiving side RAM 302 functioning as a working memory temporarily stores processing data and the like when various kinds of control programs are executed.

The receiving side ROM 303 stores various kinds of control programs for the receiving side CPU 301 to perform control, various kinds of data, etc. Moreover, various kinds of control programs for the receiving side CPU 301 to perform control, various kinds of data, etc. may be stored in the receiving side storage unit 304. The receiving side storage unit 304 may be configured by, for example, a hard disk drive device (HDD).

The communication I/F 306 is an interface for communicating with the printing control apparatus 102 via the network 105. In the printing system 100 according to the first embodiment, the receiving side CPU 301 of the image forming apparatus 103 receives the printing information from the printing control apparatus 102 connected to the network 105 via the communication I/F 306, and performs the printing control based on the printing information by using the printing control unit 309.

The receiving side image communication I/F 307 is an interface for performing image data communication with the printing control apparatus 102 via the image data communication path 106. In the printing system 100 according to the first embodiment, the receiving side CPU 301 of the image forming apparatus 103 receives the image data from the printing control apparatus 102 connected to the image data communication path 106 via the receiving side image communication I/F 307.

In order for the receiving side CPU 301 to receive the image data from the printing control apparatus 102 via the receiving side image communication I/F 307, the receiving side image signal control unit 308 performs reception control of the image data.

The printing control unit 309 performs printing of the received image data based on the printing information and the image data that are received from the printing control apparatus 102.

The receiving side operating unit 310 includes a display means and an input means, and is controlled by the receiving side CPU 301 so that the operator of the printing system 100 can operate a setting menu in the image forming apparatus 103.

The receiving side display unit 311 displays a setting screen of the setting menu set by the receiving side operating unit 310, and a printing status.

FIG. 4 is a block diagram that shows a configuration example of a serial communication apparatus that is configured by the transmitting side image communication I/F 208 of the printing control apparatus 102 in the printing system 100 and the receiving side image communication I/F 307 of the image forming apparatus 103 in the printing system 100 (a serial communication apparatus according to the first embodiment).

As shown in FIG. 4, in the serial communication apparatus according to the first embodiment, the transmitting side image communication I/F 208 and the receiving side image communication I/F 307 are connected to each other via the image data communication path 106. The image data communication path 106 is configured by, for example, a plurality of cables of the same standard. The image data communication path 106 of FIG. 4 is configured by two cables of the same standard.

A transmitting side image communication control unit 400 is a hardware component of the transmitting side image communication I/F 208. The transmitting side image communication I/F 208 functions as a transmitting side communication unit of the serial communication apparatus according to the first embodiment. Further, the receiving side image communication I/F 307 functions as a receiving side communication unit of the serial communication apparatus according to the first embodiment. The transmitting side image communication control unit 400 includes a transmitting side image processing unit 401, a parallel/serial converting unit (a P/S converting unit) 402, transmission drivers (TX) 403, a reception driver (RX) 404, and a serial/parallel converting unit (a S/P converting unit) 405.

A receiving side image communication control unit 410 is a hardware component of the receiving side image communication I/F 307. The receiving side image communication control unit 410 includes reception drivers (RX) 411, a serial/parallel converting unit (a S/P converting unit) 412, a receiving side image processing unit 413, a parallel/serial converting unit (a P/S converting unit) 414, and a transmission driver (TX) 415.

The P/S converting unit 402 converts parallel data outputted from the transmitting side image processing unit 401 into serial data (that is, data in a serial format). The serial data converted by the P/S converting unit 402 is transferred to the reception drivers (RX) 411 by the transmission drivers (TX) 403 via the image data communication path 106 (the cable).

The P/S converting unit 414 converts parallel data outputted from the receiving side image processing unit 413 into serial data. The serial data converted by the P/S converting unit 414 is transferred to the reception driver (RX) 404 by the transmission driver (TX) 415 via the image data communication path 106 (the cable).

By the way, as shown in FIG. 4, the serial communication apparatus according to the first embodiment includes a plurality of transmission drivers (four transmission drivers 403 and one transmission driver 415), and these transmission drivers have the same configuration. However, since the transmitting side image communication control unit 400 and the receiving side image communication control unit 410 are separate boards, sometimes frequencies of clocks supplied to the transmission drivers 403 and the transmission driver 415 are not the same, and further they operate independently, so that they are not in a synchronous relationship. Even in the case that the frequencies of the clocks supplied to the transmission drivers 403 and the transmission driver 415 are the same, since their phase relationships are not the same, they are not in the synchronous relationship.

FIG. 4 shows an example that the transmitting side image communication I/F 208 transmits serial data of eight lanes and receives serial data of one lane. Since the P/S converting unit 402 and the P/S converting unit 414 operate asynchronously with processing paths of the transmitting side image processing unit 401 and the receiving side image processing unit 413, depending on a delivery timing of a timing signal, sometimes skew occurs in data to be processed. Hereinafter, this skew is referred to as "inter-lane skew". Further, skew occurs due to a difference between reset release timings of the P/S converting unit 402 and the P/S converting unit 414 and a difference in a propagation delay time due to a difference in the wiring length of the transmission path from the transmission driver to the reception driver. Hereinafter, this skew is referred to as "intra-lane skew". In the inter-lane skew, the amount of skew varies during a horizontal synchronization period in each lane and is not constant. On the other hand, in the intra-lane skew, since occurrence factors of skew do not change dynamically, the amount of skew does not vary and is constant. It should be noted that the inter-lane skew and the intra-lane skew are not particularly distinguished and sometimes are simply referred to as "skew". That is, the inter-lane skew caused by a plurality of lanes and the intra-lane skew are collectively referred to as "skew".

In the transmitting side image communication I/F 208, the S/P converting unit 405 obtains the serial data from the reception driver (RX) 404 and stores it in an internal shift register. The S/P converting unit 405 detects specific data among the data having a predetermined symbol length from the serial data stored in the internal shift register, and outputs it to the transmitting side image processing unit 401 as parallel data for each predetermined symbol length according to a detection timing of the specific data. Furthermore, the S/P converting unit 405 restores the clock for receiving the data from the serial data. Further, the S/P converting unit 405 frequency-divides the restored clock according to the symbol length of the parallel data, and also outputs the frequency-divided clock to the transmitting side image processing unit 401.

In the receiving side image communication I/F 307, the S/P converting unit 412 obtains the serial data from the reception drivers (RX) 411 and stores it in an internal shift register. The S/P converting unit 412 detects specific data among the data having a predetermined symbol length from the serial data stored in the internal shift register, and outputs it to the receiving side image processing unit 413 as parallel data for each predetermined symbol length according to a detection timing of the specific data. Furthermore, the S/P converting unit 412 restores the clock for receiving the data from the serial data. Further, the S/P converting unit 412 frequency-divides the restored clock according to the symbol length of the parallel data, and also outputs the frequency-divided clock to the receiving side image processing unit 413.

Figure 5A:
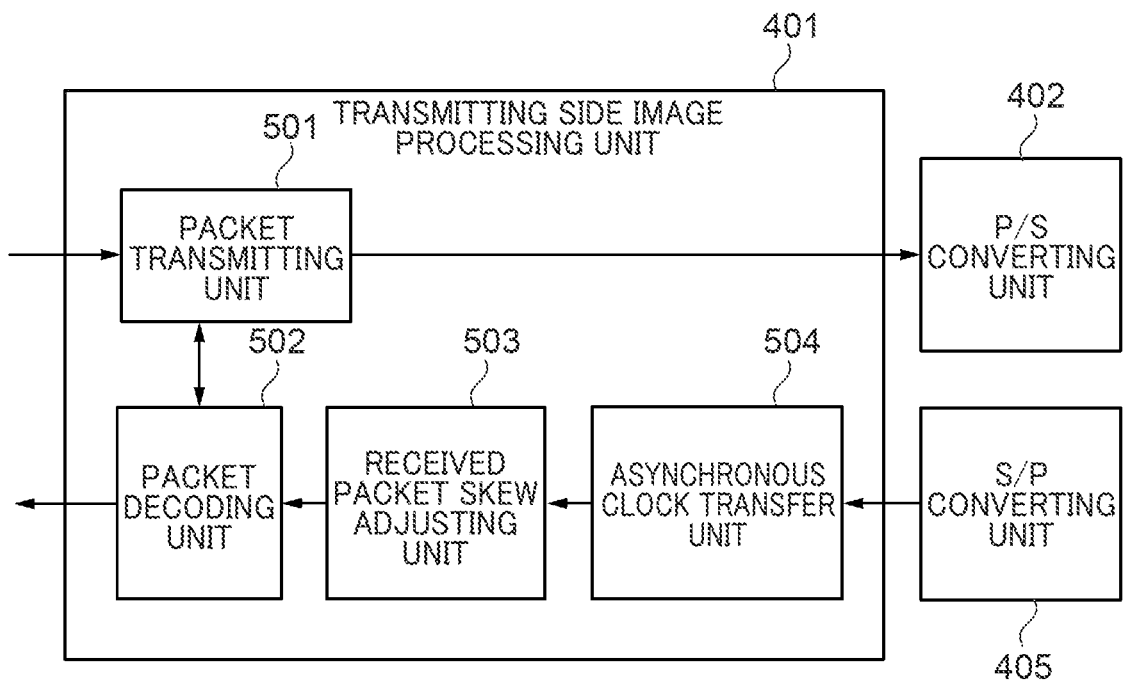
FIG. 5A is a block diagram that shows a configuration example of a transmitting side image processing unit in the transmitting side image communication I/F of the serial communication apparatus according to the first embodiment.
Figure 5B:
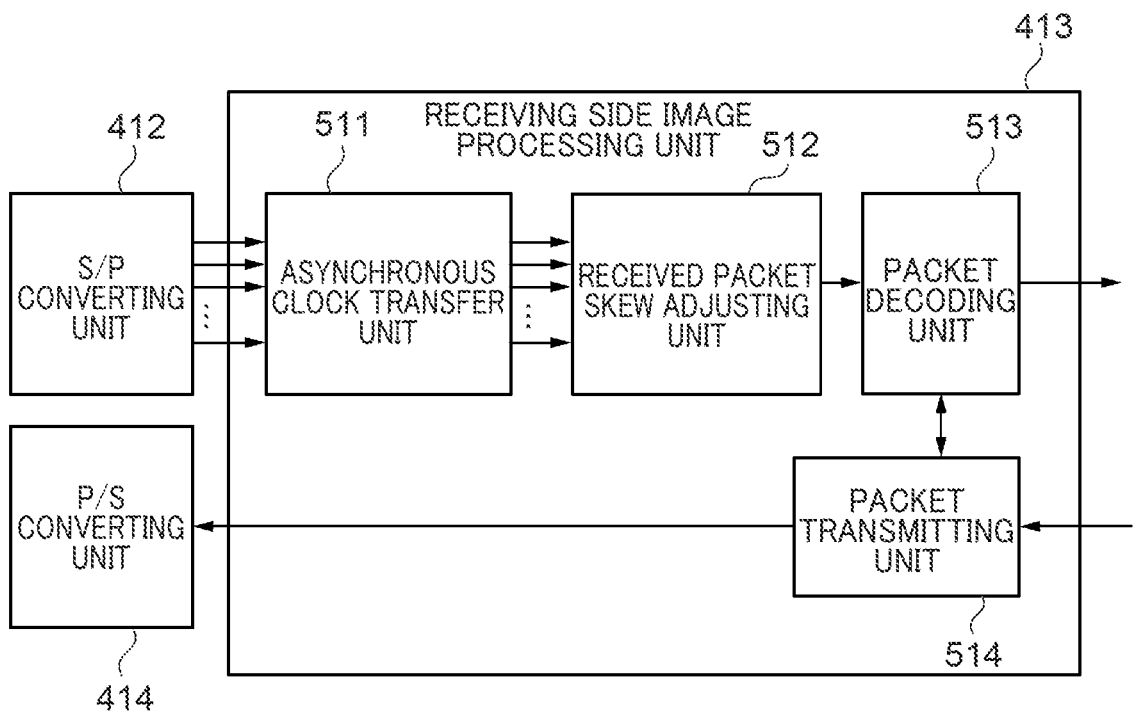
FIG. 5B is a block diagram that shows a configuration example of a receiving side image processing unit in the receiving side image communication I/F of the serial communication apparatus according to the first embodiment.

FIG. 5A is a block diagram that shows a configuration example of the transmitting side image processing unit 401 in the transmitting side image communication I/F 208 of the serial communication apparatus according to the first embodiment. Further, FIG. 5B is a block diagram that shows a configuration example of the receiving side image processing unit 413 in the receiving side image communication I/F 307 of the serial communication apparatus according to the first embodiment.

As shown in FIG. 5A, the transmitting side image processing unit 401 includes a packet transmitting unit 501, a packet decoding unit 502, a received packet skew adjusting unit 503, and an asynchronous clock transfer unit 504.

The packet transmitting unit 501 arbitrates whether to transmit a transmission command received from the packet decoding unit 502 or the image data from a processing block in the previous stage (not shown in FIG. 5A), and outputs the arbitration result to the P/S converting unit 402.

Further, the packet transmitting unit 501 divides data to be transmitted (hereinafter, simply referred to as "transmission data") into equal parts according to the number of lanes (in the case of the example of FIG. 4, the number of lanes is 8), and distributes the divided transmission data to each lane. Furthermore, the packet transmitting unit 501 adds a control code to the divided transmission data distributed to each lane, and if necessary, adds a padding to the divided transmission data distributed to the lane. Moreover, the meaning of the padding will be described later. Further, the packet transmitting unit 501 functions as a packet transmitting unit of the serial communication apparatus according to the first embodiment.

The packet decoding unit 502 decodes the packets skew-adjusted by the received packet skew adjusting unit 503, and outputs data to a processing block in the subsequent stage (not shown in FIG. 5A), or outputs the transmission command to the packet transmitting unit 501.

Further, the packet decoding unit 502 outputs the transmission command to the packet transmitting unit 501 in the following cases.

Case (1): a case of notifying the transmitting side (the other side) that the reception of the image data is completed normally Case (2): a case that when data other than the image data such as command data or status data is received, notifying the transmitting side that the reception of the data other than the image data is completed normally Case (3): a case that when data missing is detected in the received image data, notifying the transmitting side to request retransmission of missing data The received packet skew adjusting unit 503 adjusts (corrects) the intra-lane skew of the inputted parallel data of one or more lanes, and outputs the skew-adjusted packets to the packet decoding unit 502. The received packet skew adjusting unit 503 functions as a received packet skew adjusting unit of the serial communication apparatus according to the first embodiment.

The asynchronous clock transfer unit 504 is configured by, for example, a FIFO (first in first out) in which a writing clock and a reading clock are separately inputted. As the writing clock, the clock outputted from the S/P converting unit 405 can be used. Further, as the reading clock, for example, a system clock that controls the entire operation of the transmitting side image communication control unit 400 can be selected and used.

The parallel data outputted from the S/P converting unit 405 is outputted to the received packet skew adjusting unit 503, which is a processing block in the subsequent stage, at a timing synchronized with the system clock used as the reading clock in the asynchronous clock transfer unit 504. Moreover, although the transmitting side image processing unit 401 of FIG. 5A includes the asynchronous clock transfer unit 504 configured as an independent processing block (a module), the function realized by the asynchronous clock transfer unit 504 may be incorporated into the received packet skew adjusting unit 503. In this case, the asynchronous clock transfer unit 504 is unnecessary.

As shown in FIG. 5B, the receiving side image processing unit 413 includes a packet transmitting unit 514, a packet decoding unit 513, a received packet skew adjusting unit 512, and an asynchronous clock transfer unit 511.

The packet transmitting unit 514 arbitrates whether to transmit a transmission command received from the packet decoding unit 513 or the image data from a processing block in the previous stage (not shown in FIG. 5B), and outputs the arbitration result to the P/S converting unit 414.

Further, the packet transmitting unit 514 divides transmission data into equal parts according to the number of lanes (in the case of the example of FIG. 4, the number of lanes is 1), and distributes the divided transmission data to each lane. Furthermore, the packet transmitting unit 514 adds a control code to the divided transmission data distributed to each lane, and if necessary, adds a padding to the divided transmission data distributed to the lane. Further, the packet transmitting unit 514 also functions as the packet transmitting unit of the serial communication apparatus according to the first embodiment.

The packet decoding unit 513 decodes the packets skew-adjusted by the received packet skew adjusting unit 512, and outputs data to a processing block in the subsequent stage (not shown in FIG. 5B), or outputs the transmission command to the packet transmitting unit 514.

Further, the packet decoding unit 513 also outputs the transmission command to the packet transmitting unit 514 in the Case (1), the Case (2) or the Case (3) described above.

The received packet skew adjusting unit 512 adjusts (corrects) the intra-lane skew of the inputted parallel data of one or more lanes, and outputs the skew-adjusted packets to the packet decoding unit 513. The received packet skew adjusting unit 512 also functions as the received packet skew adjusting unit of the serial communication apparatus according to the first embodiment.

The asynchronous clock transfer unit 511 is configured by, for example, a FIFO in which a writing clock and a reading clock are separately inputted. As the writing clock, the clock outputted from the S/P converting unit 412 can be used. Further, as the reading clock, for example, a system clock that controls the entire operation of the receiving side image communication control unit 410 can be selected and used.

The parallel data outputted from the S/P converting unit 412 is outputted to the received packet skew adjusting unit 512, which is a processing block in the subsequent stage, at a timing synchronized with the system clock used as the reading clock in the asynchronous clock transfer unit 511. Moreover, although the receiving side image processing unit 413 of FIG. 5B includes the asynchronous clock transfer unit 511 configured as an independent processing block (a module), the function realized by the asynchronous clock transfer unit 511 may be incorporated into the received packet skew adjusting unit 512. In this case, the asynchronous clock transfer unit 511 is unnecessary.

Next, with reference to FIGS. 6A and 6B, the division of the transmission data performed by the packet transmitting unit and a packet configuration of the transmission data after the division (i.e., the divided transmission data) will be described.

FIGS. 6A and 6B are conceptual diagrams that show packet configurations of the transmission data transferred by the serial communication apparatus according to the first embodiment (that is, the transmission data after the division which is obtained by the division of the transmission data performed by the packet transmitting unit). FIG. 6A is the conceptual diagram that shows the packet configuration of the transmission data divided into eight lanes, and FIG. 6B is the conceptual diagram that shows the packet configuration of the transmission data divided into six lanes.

As shown in FIGS. 6A and 6B, a part described as "header" is a control code that indicates a start position of the main body of the subsequent data (hereinafter, simply referred to as "data main body") and the type of data. The control code corresponds to header information. The type of data includes the image data, the command data, the status data, etc. The command data includes, for example, a command that indicates the size in a main scanning direction and a sub-scanning direction of the image data, a command that notifies the start of transfer of the image data, etc. Further, the status data includes, for example, an error status for notifying that an abnormal state has occurred, an ACK status for returning a response (an ACK response) to the command data from the other side, etc. Since the size of the data packet configured depends on the type of data, the data with "header" (the control code) added to the data main body is transferred so that the side receiving data can perform appropriate processing. It is possible to judge the type of data based on "header" (the control code).

As shown in FIGS. 6A and 6B, a part described as "data" is the data main body. FIG. 6A shows an example in which the serial communication apparatus according to the first embodiment uses a total of eight lanes of Lane 0 to Lane 7 in parallel to transfer data. As shown in FIG. 6A, when N [cycle] (N is an integer of 1 or more) is transferred in each lane, "data" becomes 8N in total of 8 lanes. For example, in the case of assuming that a data width is 32 [bit] and N is 32, 8K[Byte] (i.e., the number of lanes×the data width×N (the number of cycles)=8×32×32=8,192 [bit]=8K[Byte]) will be transferred.

FIG. 6B shows an example in which the serial communication apparatus according to the first embodiment uses a total of six lanes of Lane 0 to Lane 5 in parallel to transfer data. In FIG. 6B, M is an integer of 1 or more. Similar to the example of FIG. 6A, in order to transfer data of 8K[Byte]=8,192 [bit], 8,192÷32÷6=42.6666[cycle] is required, but since it is not divisible, it is actually transferred by using 43 [cycle]. In this case, the size of the data to be transferred is the number of lanes×the data width×M (the number of cycles)=6×32×43=8,256 [bit], and as a result, 8,256−8,192=64 [bit] will be transferred extra. This extra data transfer amount is called a padding.

In this way, the packet transmitting unit 501 and the packet transmitting unit 514 divide the transmission data into equal parts according to the number of lanes, distribute the divided transmission data to each lane as the data main body, and add the control code (the header information) to the divided transmission data distributed to each lane. Also, as shown in FIG. 6B, if necessary, the packet transmitting unit 501 and the packet transmitting unit 514 add a padding to the divided transmission data distributed to the lane (Lane 5 in FIG. 6B).

The received packet skew adjusting unit 512 and the received packet skew adjusting unit 503 adjust the skew of the data received in each lane and resynthesize it as data, and in the case that a padding is added to the transmission data by the packet transmitting unit, remove the padding added to the data received in the lane.

Next, the received packet skew adjusting unit will be described in detail.

FIG. 7 is a block diagram that shows a configuration example of the received packet skew adjusting unit 512 in the receiving side image processing unit 413 of the serial communication apparatus according to the first embodiment. The received packet skew adjusting unit 512 in the receiving side image processing unit 413 will be described with reference to FIG. 7. Moreover, since the configuration of the received packet skew adjusting unit 503 in the transmitting side image processing unit 401 is the same as the configuration of the received packet skew adjusting unit 512 in the receiving side image processing unit 413, the description thereof will be omitted.

As shown in FIG. 7, the received packet skew adjusting unit 512 in the receiving side image processing unit 413 includes a writing control unit 701, a buffer control unit 702, a data buffer 703, and a reading control unit 704.

The writing control unit 701 individually generates write data to the data buffer 703 and a control signal for a writing operation in each lane based on the data after the clock transfer of each lane inputted from the asynchronous clock transfer unit 511, and outputs them to the buffer control unit 702.

The buffer control unit 702 sequentially stores (writes) the write data inputted from the writing control unit 701 in the data buffer 703 based on the control signal for the writing operation inputted from the writing control unit 701.

Then, when the data of the predetermined number of cycles is written (that is, at a timing when a writing access of the data of the predetermined number of cycles is completed in each lane), the writing control unit 701 notifies the reading control unit 704 that the writing operation is completed. Hereinafter, this notification that the writing operation is completed is simply referred to as "a writing completion notification". The writing completion notification is given individually for each lane.

At a timing when the writing completion notifications corresponding to all lanes from the writing control unit 701 are received, the reading control unit 704 notifies the buffer control unit 702 to start a reading operation. Hereinafter, this notification to start the reading operation is simply referred to as "a reading start notification".

By the buffer control unit 702 performing reading access control with respect to the data buffer 703 at a timing when the reading start notification is received from the reading control unit 704, the buffer control unit 702 starts the reading operation (a reading access) and starts data transfer from the data buffer 703 to the outside.

Next, a skew adjusting operation performed by the received packet skew adjusting unit 512 will be described.

Figure 8A:
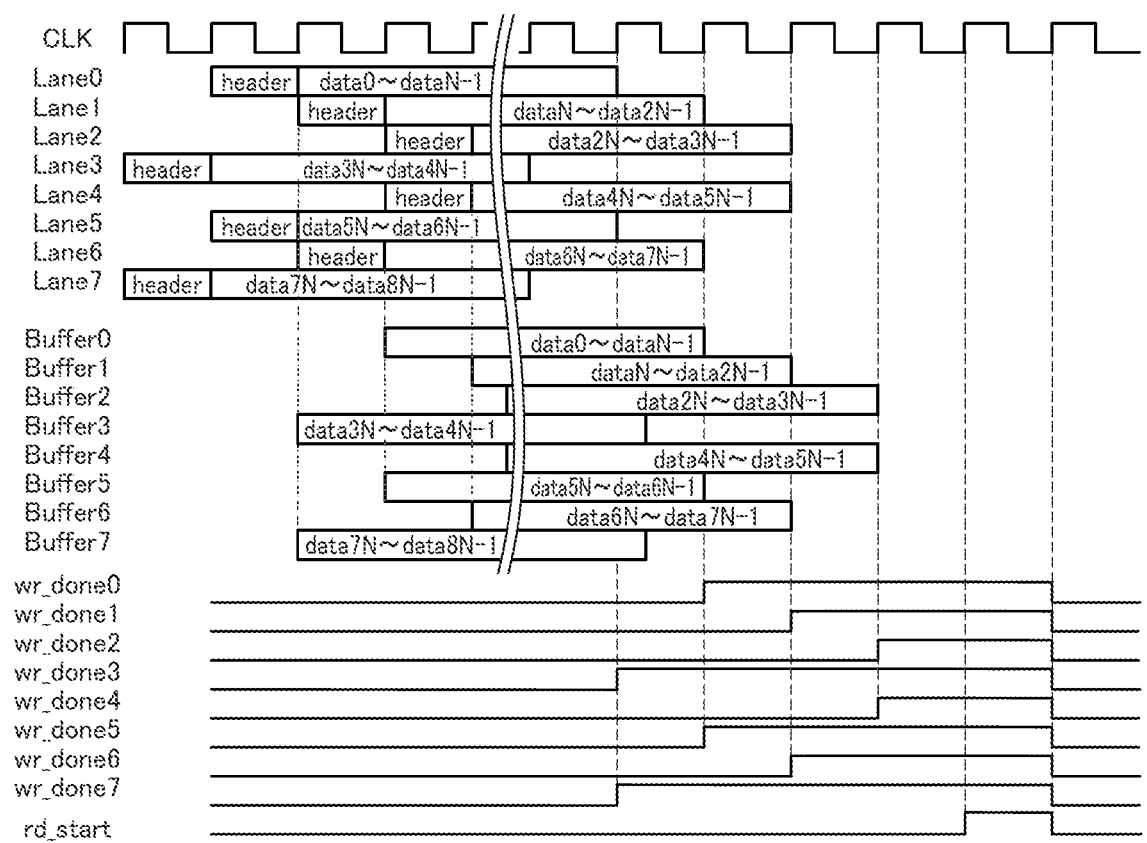
FIGS. 8A and 8B are diagrams that show examples of a skew adjusting operation performed by the received packet skew adjusting unit of FIG. 7.
Figure 8B:
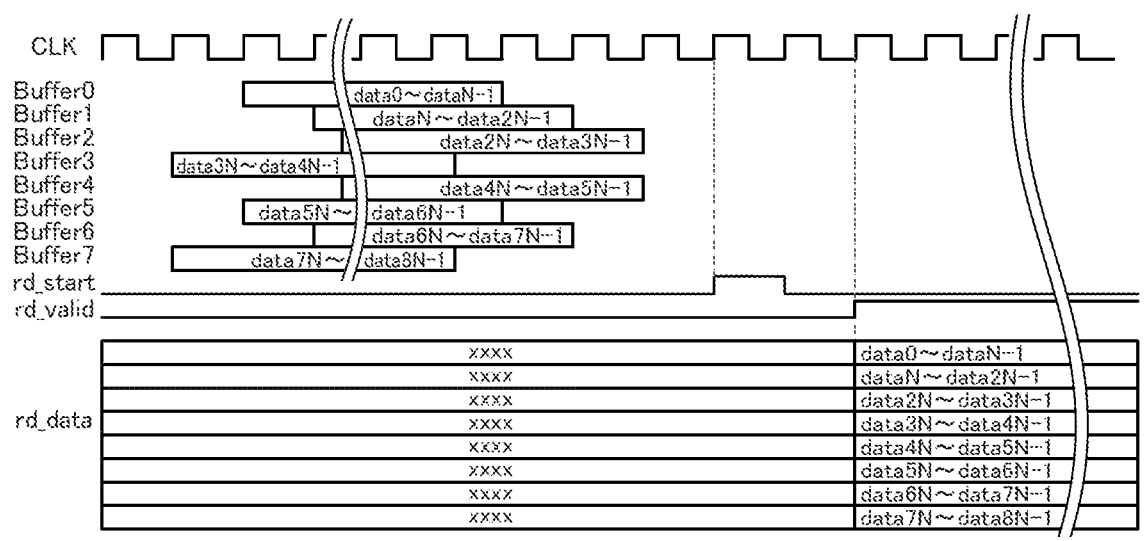

FIGS. 8A and 8B are diagrams that show examples of the skew adjusting operation performed by the received packet skew adjusting unit 512 of FIG. 7. FIG. 8A is a conceptual diagram for explaining the skew adjusting operation on writing side of the received packet skew adjusting unit 512 of FIG. 7, and FIG. 8B is a conceptual diagram for explaining the skew adjusting operation on reading side of the received packet skew adjusting unit 512 of FIG. 7.

As shown in FIG. 8A, the data of each lane (Lane 0 to Lane 7) inputted from the asynchronous clock transfer unit 511 is inputted into the received packet skew adjusting unit 512 while being affected by the skew.

The data of each lane (Lane 0 to Lane 7) is configured by a control code "header" indicating the start position of a data main body, and the data main body. The received packet skew adjusting unit 512 detects this control code "header" in each lane, and performs the writing access (the writing operation) to the data buffer 703 based on a detection timing of this control code "header".

As described above, the inter-lane skew occurs due to the dynamic change in the amount of skew during the horizontal synchronization period in each lane. Therefore, there is a problem that even in the case that the skew is adjusted (corrected) at the beginning of the data, thereafter, there is a possibility that the inter-lane skew occurs in the data during the horizontal synchronization period in each lane.

Therefore, in the serial communication apparatus according to the embodiment of the present invention, the received packet skew adjusting unit 512 solves the above-mentioned problem by performing the following skew adjusting operation. That is, the writing control unit 701 notifies the reading control unit 704 of the writing completion notification (in FIG. 8A, signals represented as wr_done0 to wr_done7) at the timing when the writing access of the data of the predetermined number of cycles is completed in each lane. Next, the reading control unit 704 notifies the buffer control unit 702 of the reading start notification (in FIG. 8A, a signal represented as rd_start) at the timing when all the writing completion notifications corresponding to each lane from the writing control unit 701 are received.

By performing the skew adjusting operation described above, as shown in FIG. 8B, it is possible to perform reading out of the data (in FIG. 8B, a signal represented as rd_data) without using a special control code in a state where the inter-lane skew is corrected (adjusted). It should be noted that the state where the inter-lane skew is corrected (adjusted) means a state in which the skew adjusting is performed and the phases of the data in each lane are aligned. Further, a validity period of read data is represented as rd_valid in FIG. 8B.

In the example of FIG. 6A, when the data of 32[cycle] with the data width 32 [bit] for each lane is transferred, the writing side of the received packet skew adjusting unit 512 receives "data" of 8×32×32=8,192 [bit]=8K[Byte] in total of 8 lanes.

Assuming that a read data width is 32×8=256 [bit], the reading side of the received packet skew adjusting unit 512 completes the reading out of the data (data reading) at 8,192÷256=32[cycle].

On the other hand, in the example of FIG. 6B, when the data of 43 [cycle] with the data width 32 [bit] for each lane is transferred, the writing side of the received packet skew adjusting unit 512 receives "data" of 6×32×43=8,256 [bit] in total of 6 lanes.

Among "data" received by the writing side of the received packet skew adjusting unit 512, 8,256−8,192=64 [bit] is a padding part. Assuming that the read data width is 256 [bit] as in the example of FIG. 6A, the reading side of the received packet skew adjusting unit 512 completes the desired reading out of the data (the data reading) at 8,192÷256=32[cycle]. Regarding the padding part 64 [bit], the reading side of the received packet skew adjusting unit 512 removes the padding part 64 [bit] by not performing the reading out of the data (the data reading).

Next, the operation of the serial communication apparatus according to the first embodiment in the case that the received packet skew adjusting unit 512 cannot detect (recognize) the control code "header" will be described.

In the case that the received packet skew adjusting unit 512 cannot recognize the control code "header" indicating the start position of the data main body in any one or more lanes, the received packet skew adjusting unit 512 does not perform the reading out of the data from the data buffer 703. In this case, first, the received packet skew adjusting unit 512 notifies the packet transmitting unit 514 via the packet decoding unit 513 that the recognition of the control code "header" has failed (hereinafter, simply referred to as "a header recognition failure notification"). Next, at a timing when the header recognition failure notification is received from the received packet skew adjusting unit 512, the packet transmitting unit 514 transmits data (a status packet) that requests retransmission of data that the control code "header" could not be recognized.

The case that the control code "header" cannot be recognized means that a code value at the position of the control code "header" changes due to the influence of noises or the like occurred in the transmission path and changes from a predetermined value, so that it cannot be recognized as a code value.

In the case that the control code "header" cannot be recognized, the received packet skew adjusting unit 512 cannot start the writing access to the data buffer 703. Therefore, if the control code "header" cannot be recognized just in a certain lane, when performing the reading out of the data from the data buffer 703, the data divided at the time of transmission cannot be normally combined. Therefore, in the serial communication apparatus according to the first embodiment, the receiving side image communication control unit 410 discards the said data, and transmits a status packet, which requests retransmission from the said data, to the transmitting side image communication control unit 400 by the packet transmitting unit 514. Moreover, the said data means the data that the control code "header" could not be recognized.

The transmitting side image communication control unit 400, which is requested by the receiving side image communication control unit 410 to perform the retransmission from the said data, stops the operation of the packet transmitting unit 501, and performs transmission from the data packet that has received the retransmission request. There is a possibility that a data packet that was being transmitted (a data packet in the middle of transmission) exists until the data retransmission is performed by the packet transmitting unit 501. Therefore, the receiving side image processing unit 413 performs an operation of discarding the received data until the transmitting side image communication control unit 400 recognizes that the desired data packet that retransmission of the data packet in the middle of transmission is requested should be retransmitted. That is, in the case that the received packet skew adjusting unit 512 requests retransmission from the packet transmitting unit 501, the received packet skew adjusting unit 512 discards the received data before receiving the retransmission of the data requested to be retransmitted from the packet transmitting unit 501. This is because if being erroneously recognized as the data packet that retransmission of the data packet in the middle of transmission is requested, the continuity of the data is interrupted.

In this way, when the receiving side image communication control unit 410 succeeds in normally receiving the data packet retransmitted from the transmitting side image communication control unit 400, it is possible to complement the data missing.

Next, the operation of the serial communication apparatus according to the first embodiment in the case that burst transfer of the image data is performed will be described.

Figure 9:
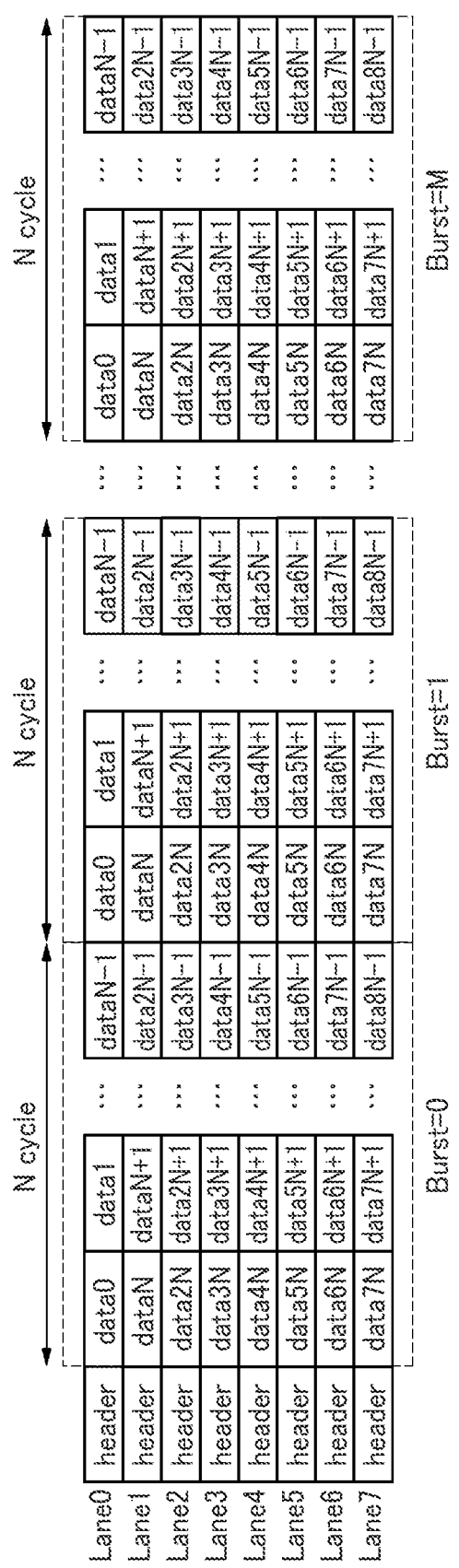
FIG. 9 is a conceptual diagram for explaining a case that data is burst-transferred by using the packet configuration of the data divided into eight lanes shown in FIG. 6A.

FIG. 9 is a conceptual diagram for explaining a case that data is burst-transferred (continuously transferred) by using the packet configuration of the data divided into eight lanes shown in FIG. 6A.

Similar to FIG. 6A, as shown in FIG. 9, a part described as "header" is a control code that indicates the start position of the subsequent data main body, and a part described as "data" is the data main body. FIG. 9 shows an example in which the serial communication apparatus according to the first embodiment uses a total of eight lanes of Lane 0 to Lane 7 in parallel to burst-transfer the data. As shown in FIG. 9, as one data packet, it is the same as the example of FIG. 6A (hereinafter, simply referred to as "a first example") that N [cycle] (N is an integer of 1 or more) is transferred in each lane and "data" becomes 8N in total of 8 lanes. Further, in the example of the burst transfer of FIG. 9 (hereinafter, simply referred to as "a second example"), the control code "header" also indicates the number of continuous data packets.

In the first example, when the next data packet is transferred, although it is necessary to always start from the control code "header", the data main body is not transferred for at least one [cycle] period. Therefore, the effective transfer efficiency of the first example becomes 32/(1+32)≈96.97[%]. As a result, according to the data transfer performed by the serial communication apparatus according to the first embodiment, it is possible to obtain a high effective transfer efficiency.

Further, in the second example, one or more data packets are continuously transferred after the control code "header". For example, in the case that the number of continuous data packets is 20, the effective transfer efficiency of the second example becomes 32×20/(1+32×20)≈99.84[%]. As a result, according to the burst transfer performed by the serial communication apparatus according to the first embodiment, it is possible to obtain an effective transfer efficiency close to almost 100%.

In the case that the serial communication apparatus according to the first embodiment performs the burst transfer, the operations of the packet transmitting unit and the received packet skew adjusting unit are as follows.

The packet transmitting unit 501 and the packet transmitting unit 514 divide the transmission data into equal parts according to the number of lanes, distribute the divided transmission data to each lane as the data main body, and add the control code (the header information) to the divided transmission data distributed to each lane. Further, if necessary, the packet transmitting unit 501 and the packet transmitting unit 514 add a padding to the divided transmission data distributed to the lane. Furthermore, in the case of continuously transmitting the data packet, the packet transmitting unit 501 and the packet transmitting unit 514 switches between adding the control code "header" to the data packet and skipping the addition of the control code "header" to the data packet.

The received packet skew adjusting unit 512 and the received packet skew adjusting unit 503 adjust the skew of the data received in each lane and resynthesize it as data, and in the case that a padding is added to the transmission data by the packet transmitting unit, remove the padding added to the data received in the lane. Further, in the case of continuously receiving the data packet, the received packet skew adjusting unit 512 and the received packet skew adjusting unit 503 notifies the buffer control unit 702 to switch the data buffer 703 based on the interpretation of the control code "header".

In order for the serial communication apparatus according to the first embodiment to perform the burst transfer, the data buffer 703 is configured by a double buffer, for example, is configured by a double buffer that includes a data buffer A and a data buffer B.

Figure 10:
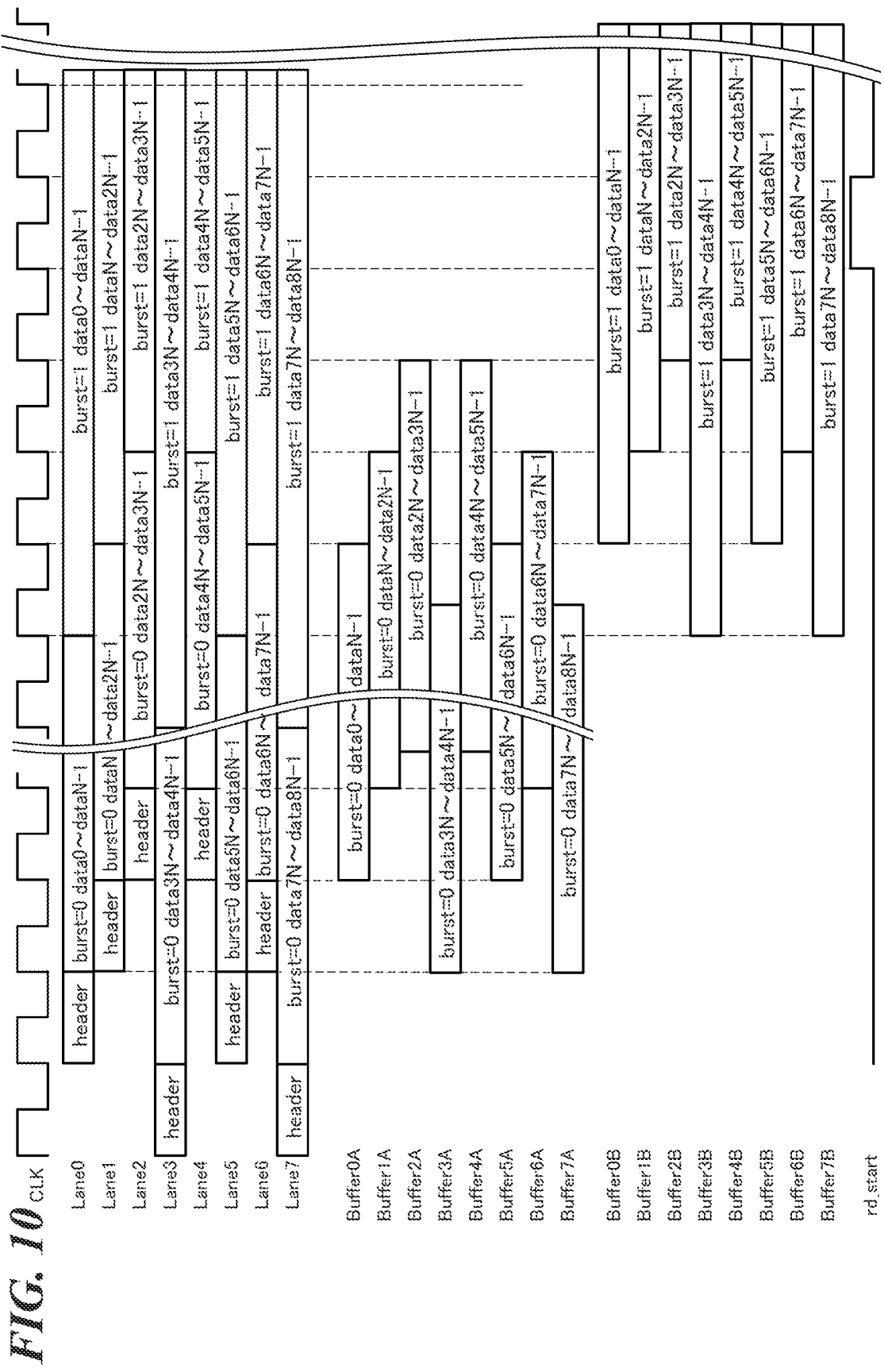
FIG. 10 is a conceptual diagram for explaining a data buffer switching operation performed by the received packet skew adjusting unit of FIG. 7.

With reference to FIG. 10, the reason why it is necessary to switch the data buffer 703 configured by the data buffer A and the data buffer B will be described. FIG. 10 is a conceptual diagram for explaining a data buffer switching operation performed by the received packet skew adjusting unit of FIG. 7.

As shown in FIG. 10, the first data packet of continuous data packets is expressed as burst=0, and the second data packet of the continuous data packets is expressed as burst=1. Further, although not shown in FIG. 10, with respect to the third data packet and subsequent data packets of the continuous data packets, this burst value is incremented by 1. Although the data of burst=0 received in each lane (Lane 0 to Lane 7) is written to the data buffer A, the data of the next burst=1 is received at a read timing of the data of burst=0. If the data of burst=1 is written to the same data buffer A, it will be overwritten before reading the data of burst=0, therefore, in order to prevent data overwriting, the data buffer 703 needs to adopt a double buffer configuration. Then, while the data of burst=0 is being written to the data buffer A and the data of burst=1 is being written to the data buffer B, the data reading of the data of burst=0 is started. If a completion timing of the data reading of the data of burst=0 is earlier than the start of writing the data of burst=2, the data of burst=2 can be written to the data buffer A.

Furthermore, in the case that the completion timing of the data reading of the data of burst=0 is later than the start of writing the data of burst=2, the data of burst=2 needs to be written to a data buffer C (not shown in FIG. 10). This is also to prevent the data overwriting. Moreover, in the case that the data buffer 703 is configured by a dual port SRAM (Static Random Access Memory), the data buffer 703 may adopt a double buffer configuration as long as the writing operation does not overtake the reading operation.

Next, the operation of the serial communication apparatus according to the first embodiment in the case that a CRC (Cyclic Redundancy Check) is added to the packet configuration of the image data will be described.

Figure 11:
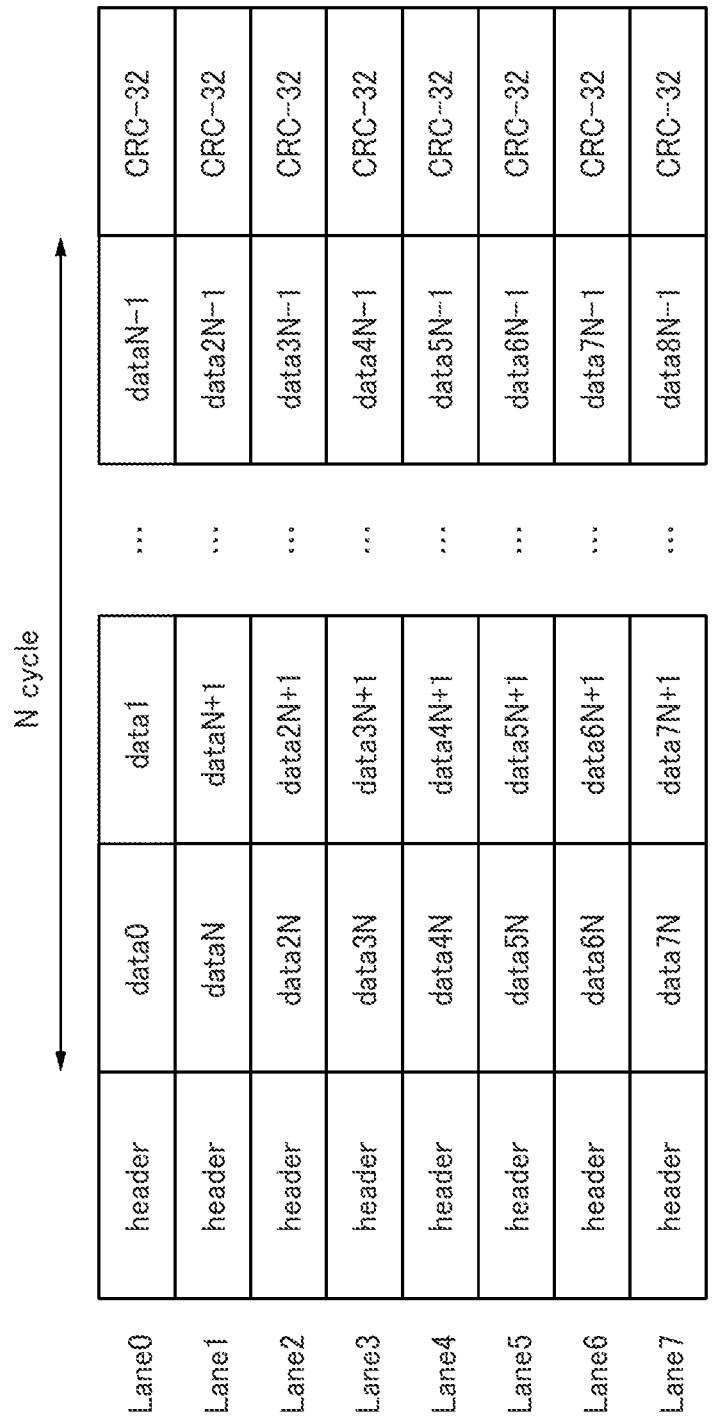
FIG. 11 is a conceptual diagram for explaining a case that a CRC is added to the packet configuration of the data divided into eight lanes shown in FIG. 6A.

FIG. 11 is a conceptual diagram for explaining a case that a CRC is added to the packet configuration of the data divided into eight lanes shown in FIG. 6A.

Similar to FIG. 6A, as shown in FIG. 11, a part described as "header" is a control code that indicates the start position of the subsequent data main body, and a part described as "data" is the data main body.

The CRC that follows the data main body is a cyclic redundancy check code, which is a kind of error detection code, and is mainly used for detecting accidental errors associated with data transfer or the like. The transmitting side adds a remainder obtained by dividing by a prescribed generator polynomial as a check value to the transmission data and transmits it, and the receiving side divides the received data by using the same generator polynomial, and compares and collates a remainder (a calculation value) with the check value, thus, it is possible to detect errors and corruption of the received data.

A CRC, in which the length of the check value is n bits, is called an n-bit CRC, and in FIG. 11, as the check value of the CRC that follows the data main body, a 32-bit CRC-32 is used. The CRC-32 is generated by using, for example, a function called crc32.

FIG. 11 shows an example in which the serial communication apparatus according to the first embodiment uses a total of eight lanes of Lane 0 to Lane 7 in parallel to transfer data (hereinafter, simply referred to as "a third example"). As shown in FIG. 11, as one data packet, it is the same as the example of FIG. 6A (the first example) that N [cycle] (N is an integer of 1 or more) is transferred in each lane and "data" becomes 8N in total of 8 lanes.

There is a possibility that the change in the value due to the influence of noises or the like occurred in the transmission path, which has already been described in the case that the control code "header" cannot be recognized in the first example, occurs also with respect to the data main body other than the control code "header" part, and if that happens, the data will be lost.

In the case that the serial communication apparatus according to the first embodiment transfers data having a packet configuration, in which the CRC is added following the control code "header" and the data main body, the operations of the packet transmitting unit and the received packet skew adjusting unit are as follows.

The packet transmitting unit 501 and the packet transmitting unit 514 divide the transmission data into equal parts according to the number of lanes, distribute the divided transmission data to each lane as the data main body, and add the control code (the header information) to the divided transmission data distributed to each lane. Further, if necessary, the packet transmitting unit 501 and the packet transmitting unit 514 add a padding to the divided transmission data distributed to the lane. Furthermore, the packet transmitting unit 501 and the packet transmitting unit 514 add the check value of the error detection code for confirming the data missing (in the third example, the CRC-32, which is the check value of the CRC code) to the divided transmission data distributed to each lane.

The received packet skew adjusting unit 512 and the received packet skew adjusting unit 503 adjust the skew of the data received in each lane and resynthesize it as data, and in the case that a padding is added to the transmission data by the packet transmitting unit, remove the padding added to the data received in the lane. Further, the received packet skew adjusting unit 512 and the received packet skew adjusting unit 503 generate the calculation value of the error detection code (in the third example, the calculation value of the CRC code) for each lane based on the control code "header" and the data packet (the received data) that are received for each lane.

Then, the received packet skew adjusting unit 512 and the received packet skew adjusting unit 503 judge whether or not there is the data missing for each lane based on the check value of the error detection code received for each lane and the calculation value of the error detection code generated for each lane.

In the case that the received packet skew adjusting unit 512 detects the data missing based on the check value of the CRC code and the calculation value of the CRC code, in order to cancel the reading out of the data from the data buffer 703, the received packet skew adjusting unit 512 does not activate a wr_done signal in the lane where the data missing is detected. Moreover, not activating the wr_done signal means that the writing control unit 701 does not notify the reading control unit 704 of the writing completion notification. By doing so, it becomes impossible to read out the data including the missing data from the data buffer 703, and the receiving side image processing unit 413 can discard the said missing data. Then, in order to complement the data missing, the receiving side image communication control unit 410 transmits a status packet, which requests retransmission from the said missing data, to the transmitting side image communication control unit 400 by the packet transmitting unit 514.

The transmitting side image communication control unit 400, which is requested by the receiving side image communication control unit 410 to perform the retransmission from the said missing data, stops the operation of the packet transmitting unit 501, and performs transmission from the data packet that has received the retransmission request. In this way, when the receiving side image communication control unit 410 succeeds in normally receiving the data packet retransmitted from the transmitting side image communication control unit 400, it is possible to complement the data missing.

Moreover, the serial communication apparatus according to the first embodiment can perform the burst transfer of the image data by combining the second example and the third example. In the case of performing the burst transfer by combining the second example and the third example, the packet configuration is such a packet configuration that after the control code "header", one or more data packets are continuous, and after the continuous data packets, the check value of the CRC code is added.

Next, the operation of the serial communication apparatus according to the first embodiment in the case that a time-out is detected will be described.

There are a first case and a second case that although the receiving side image communication control unit 410 requests the transmitting side image communication control unit 400 to perform retransmission of the data, the transmitting side image communication control unit 400 does not perform transmission from the data packet that has received the retransmission request. By the way, the first case is a case that the continuous data from the previous is continuously transmitted, and the second case is a case that the operation of the packet transmitting unit 501 is continuously stopped and the transmission from the data packet that has received the retransmission request is not performed. It is considered that this is because the transmitting side image communication control unit 400 could not normally receive the retransmission request of the data.

In this state, the receiving side image communication control unit 410 cannot normally receive the data packet retransmitted from the transmitting side image communication control unit 400, and it is not possible to complement the data missing.

Therefore, the operation of the serial communication apparatus according to the first embodiment is as follows.

The receiving side image communication control unit 410 judges that a time-out has occurred in the case that the expected data reception in any one or more lanes cannot be received even after a predetermined time has elapsed, and transmits data, which requests retransmission from the data that the time-out is detected, to the transmitting side image communication control unit 400.

When the transmitting side image communication control unit 400, which is requested by the receiving side image communication control unit 410 to perform the retransmission of the data, succeeds in receiving the second data retransmission request, the transmitting side image communication control unit 400 can perform transmission from the data packet that has received the retransmission request. Then, when the receiving side image communication control unit 410 succeeds in normally receiving the data packet retransmitted from the transmitting side image communication control unit 400, it is possible to complement the data missing.

As described above, by the methods described in respective examples, the serial communication apparatus according to the first embodiment can eliminate the timing lag between the serial data transferred via the plurality of routes without lowering the effective transfer efficiency, increasing the circuit scale, and requiring complicated control.

Although the preferred embodiments of the present invention have been described above, the present invention is not limited to the above-described embodiments, and various modifications and changes can be made within the scope of the gist thereof.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-089306, filed May 27, 2021, which is hereby incorporated by reference herein in its entirety.

What is claimed is:

1. A serial communication apparatus that transfers serial data transmitted from a transmitting side communication unit disposed on a transmitting side to a receiving side communication unit disposed on a receiving side via a plurality of lanes, wherein
the transmitting side communication unit comprises a packet transmitting unit configured to
divide transmission data into equal parts according to the number of the lanes,
distribute the divided transmission data to each lane as a data main body, and
add header information indicating the type of the transmission data to the divided transmission data distributed to each lane,
wherein the receiving side communication unit comprises a received packet skew adjusting unit configured to adjust skew of data received in each lane, and
wherein the received packet skew adjusting unit
detects the header information of the data received in each lane,
writes the data main body of the received data to a data buffer at a detection timing, and
starts data transfer from the data buffer to the outside at a timing when a writing access of the data main body of a predetermined number of cycles is completed in each lane.

2. The serial communication apparatus according to claim 1,
wherein in a case that a padding is added to the divided transmission data distributed to the lane by the packet transmitting unit, the received packet skew adjusting unit removes the padding.

3. The serial communication apparatus according to claim 1,
wherein the transmitting side communication unit continuously transmits one or more data packets after the header information,
the received packet skew adjusting unit continuously receives the data packets,
the header information also indicates the number of the data packets, and
the data buffer is configured by a double buffer.

4. The serial communication apparatus according to claim 1,
wherein the transmitting side communication unit adds a check value of an error detection code for confirming data missing to the divided transmission data distributed to each lane, and
the received packet skew adjusting unit judges whether or not there is the data missing for each lane based on the check value received for each lane and a calculation value of the error detection code generated for each lane.

5. The serial communication apparatus according to claim 4,
wherein in a case that the received packet skew adjusting unit detects the data missing based on the check value and the calculation value, the received packet skew adjusting unit does not give a writing completion notification for the lane where the data missing is detected, and requests the transmitting side communication unit to perform retransmission from data that the data missing is detected.

6. The serial communication apparatus according to claim 1,
wherein in a case that the header information of the data received in each lane cannot be recognized, the received packet skew adjusting unit requests the transmitting side communication unit to perform retransmission from data that the header information could not be recognized.

7. The serial communication apparatus according to claim 1,
wherein in a case that a time-out of the data received in each lane is detected, the received packet skew adjusting unit requests the transmitting side communication unit to perform retransmission from data that the time-out is detected.

8. The serial communication apparatus according to claim 5,
wherein in a case that the received packet skew adjusting unit requests the transmitting side communication unit to perform the retransmission, the received packet skew adjusting unit discards the received data before receiving retransmission of the data that the retransmission is requested from the transmitting side communication unit.

9. A serial communication method that is used in a serial communication apparatus that transfers serial data transmitted from a transmitting side communication unit disposed on a transmitting side to a receiving side communication unit disposed on a receiving side via a plurality of lanes, wherein
the transmitting side communication unit comprises a packet transmitting unit configured to
divide transmission data into equal parts according to the number of the lanes,
distribute the divided transmission data to each lane as a data main body, and
add header information indicating the type of the transmission data to the divided transmission data distributed to each lane,
the receiving side communication unit comprises a received packet skew adjusting unit configured to
adjust skew of data received in each lane, and wherein the received packet skew adjusting unit comprises a step of detecting the header information of the data received in each lane,
writing the data main body of the received data to a data buffer at a detection timing, and
starting data transfer from the data buffer to the outside at a timing when a writing access of the data main body of a predetermined number of cycles is completed in each lane.

* * * * *